UNITED STATES PATENT OFFICE
PTO – BOYERS, PA DUTY STATION

---

PAGE NOT AVAILABLE

PATENT NUMBER X6989 FOR THE ISSUE DATE 4/6/1832 HAS BEEN SCANNED/LOADED, BUT WITH MISSING PAGE(S). UPON RECEIPT OF THE MISSING PAGE(S), THE ENTIRE DOCUMENT WILL BE RESCANNED. THIS NOTICE IS FOR THE MISSING PAGE CONTAINING:

Missing ALL Drawings

DATA CONVERSION OPERATION
BOYERS, PA

X6989 [illegible] 4-6-1832 417

Josiah Pratt Junr

Letters Patent

The schedule referred to in these Letters Patent and making part of the same containing a description in the words of the said Josiah Pratt Junr himself of his improvement in the Machine for making Axes.

---

To all to whom these presents shall come. Be it known that I Josiah Pratt Junr of Charlemont in the County of Franklin and State of Massachusetts have invented a new and useful Machine for Making Axes and that the following is a full and exact description of the construction and operation of the said Machine as invented by me. Take two cast steel dies designated by the Appellation of hammer die and anvil die. The hammer die should be six inches in length about three inches wide and three high. The sides and ends of both dies should be perfectly straight. The anvil die should be of the same dimensions as the hammer dies, though it may be an eighth of an inch wider. The face of the anvil die, meaning by the faces of the dies that portion of the surface of the dies contained between the lengths and widths of the dies, should be made a regular convex curve whose perpendicular would be an eighth of an inch more or less. One and a quarter of an inch of the face of the hammer die from the front end should be regularly rounded, and most rounded at the very end. The remainder of the face of the hammer die after one and a quarter of an inch from the front end, should be a regular concave, the right hand side of the face more concave than the left hand side so that there should be a space of three sixteenths of an inch on the right hand side and one eighth of an inch on the left hand side in the centre of the face, when applied to the face of the anvil die, as represented in the model. It is intended that the two faces of the dies shall not touch each other when brought in contact except at the point one and a quarter inch from the front end of the hammer die and at the rear ends of both dies. In using the dies in the operation of hammering, the hammer die should be so placed that.

418 X6989

4-6-1832 that its face should project to the right of the anvil die one quarter or five sixteenths of an inch leaving one quarter or five sixteenths of an inch of the face of the anvil die to the left. The dies are used in the same manner and on the same principle of the common tilt hammer propelled by water power. — With the aforementioned dies placed and used in manner aforesaid we lay the foundation of the axe from the bar of iron. — To finish the axe there is another set of dies described as follows to wit. take two cast steel dies each of about eight inches long three inches wide on the face and three high, sides and ends straight or otherwise like the former ones. — The faces of these two last dies are to be made precisely alike as follows. From the centre of the faces of the dies make them concave each way two and five eighths of of an inch or about that so that when the faces of these dies are applied to each other, the space between the dies in front shall be three quarters of an inch in the centre and the space between the dies in the rear shall be one eighth or one sixteenth of an inch. From the extremities of the cavities the remainder of the faces on each end of the dies must be regularly rounded and most rounded at each of the ends so that the space between the extreme ends shall be about one half of an inch when the faces are brought in contact as represented by the model forming at the ends of the dies jaws for the purpose of welding and spreading the axe. In using these last dies in the manner and on the principle aforesaid they are so placed as not to project. The faces of the last mentioned dies when applied to each other will touch each other only in the points where the concavities end. — The manner of holding the iron under the dies and the skill of moulding the axe can be learned only by observation and practice Exd. Witnesses

WJC

Homer Brainard
Willm Chapman

Josiah Pratt Jun